United States Patent
Svoboda et al.

(10) Patent No.: US 10,253,241 B2
(45) Date of Patent: Apr. 9, 2019

(54) WATER BASED COMPLETION AND DISPLACEMENT FLUID AND METHOD OF USE

(71) Applicant: M-I L.L.C., Houston, TX (US)

(72) Inventors: Charles Svoboda, Katy, TX (US); Raymond David Ravitz, Houston, TX (US); Mark R. Luyster, Houston, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 14/079,198

(22) Filed: Nov. 13, 2013

(65) Prior Publication Data

US 2015/0152316 A1 Jun. 4, 2015

Related U.S. Application Data

(63) Continuation of application No. 13/335,251, filed on Dec. 22, 2011, now Pat. No. 8,592,354, which is a continuation of application No. 11/337,174, filed on Jan. 20, 2006, now Pat. No. 8,105,989.

(60) Provisional application No. 60/668,485, filed on Apr. 5, 2005.

(51) Int. Cl.
| | |
|---|---|
| *C09K 8/52* | (2006.01) |
| *E21B 43/00* | (2006.01) |
| *E21B 37/08* | (2006.01) |
| *C09K 8/32* | (2006.01) |
| *E21B 37/00* | (2006.01) |

(52) U.S. Cl.
CPC ............ *C09K 8/52* (2013.01); *C09K 8/32* (2013.01); *E21B 37/00* (2013.01)

(58) Field of Classification Search
None
See application file for complete search history.

(56) References Cited

U.S. PATENT DOCUMENTS

| | | | |
|---|---|---|---|
| 2,661,334 A | 12/1953 | Lummus | |
| 3,629,104 A * | 12/1971 | Maddox, Jr. .......... | C07D 233/16 252/392 |
| 3,718,585 A * | 2/1973 | Lumus et al. ........... | C09K 8/22 175/65 |
| 3,868,998 A | 3/1975 | Lybarter et al. | |
| 3,924,047 A | 12/1975 | Ward, Jr. et al. | |
| 4,169,818 A | 10/1979 | DeMartino | |
| 4,533,487 A | 8/1985 | Jones | |
| 4,807,703 A | 2/1989 | Jennings, Jr. | |
| 4,860,830 A | 8/1989 | Jennings, Jr. et al. | |
| 4,939,203 A | 7/1990 | Marrocco | |
| 4,986,355 A | 1/1991 | Casad et al. | |
| 5,441,927 A | 8/1995 | Mueller et al. | |
| 5,458,197 A | 10/1995 | Chan | |
| 5,458,198 A | 10/1995 | Hashemi et al. | |
| 5,603,835 A * | 2/1997 | Cheung .................. | C07C 29/86 210/192 |
| 5,620,946 A | 4/1997 | Jahnke et al. | |
| 5,654,009 A | 8/1997 | Hata et al. | |
| 5,807,811 A | 9/1998 | Malchow, Jr. | |
| 5,888,944 A | 3/1999 | Patel | |
| 6,112,814 A | 9/2000 | Chan et al. | |
| 6,140,277 A | 10/2000 | Tibbles et al. | |
| 6,169,058 B1 | 1/2001 | Le et al. | |
| 6,218,342 B1 | 4/2001 | Patel | |
| 6,242,389 B1 | 6/2001 | Elliott et al. | |
| 6,509,301 B1 | 1/2003 | Vollmer | |
| 6,631,764 B2 | 10/2003 | Parlar et al. | |
| 6,790,811 B2 | 9/2004 | Patel | |
| 6,806,233 B2 | 10/2004 | Patel | |
| 6,818,594 B1 | 11/2004 | Freeman et al. | |
| 6,869,445 B1 | 3/2005 | Johnson | |
| 6,877,563 B2 * | 4/2005 | Todd et al. ................... | 166/312 |
| 7,188,676 B2 * | 3/2007 | Qu ........................... | C09K 8/52 166/291 |
| 8,105,989 B2 * | 1/2012 | Svoboda et al. .............. | 507/261 |
| 8,592,354 B2 * | 11/2013 | Svoboda et al. .............. | 507/267 |
| 8,598,090 B2 | 12/2013 | Svoboda et al. | |
| 9,085,725 B2 | 7/2015 | Svoboda et al. | |
| 2001/0036905 A1 | 11/2001 | Parlar et al. | |

(Continued)

FOREIGN PATENT DOCUMENTS

| | | |
|---|---|---|
| DE | 4019266 A1 | 1/1992 |
| EP | 229912 A2 | 7/1987 |

(Continued)

OTHER PUBLICATIONS

Examination and Search Report issued in corresponding Application No. UAE/P/908/2007 in United Arab Emirates with English communication reporting the same, dated Oct. 21, 2014 (13 pages).

(Continued)

*Primary Examiner* — John J Figueroa
(74) *Attorney, Agent, or Firm* — David J. Smith

(57) ABSTRACT

A method of cleaning a wellbore prior to the production of oil or gas is disclosed, wherein the wellbore has been drilled with an invert emulsion drilling mud that forms an invert emulsion filter cake. The method may include the steps of circulating a breaker fluid into the wellbore, where the breaker fluid includes an aqueous fluid, a water soluble polar organic solvent, a hydrolysable ester of a carboxylic acid, and a weighting age, and where the hydrolysable ester is selected so that upon hydrolysis an organic acid is released and the invert emulsion of the filter cake breaks.

14 Claims, No Drawings

(56) References Cited

U.S. PATENT DOCUMENTS

| | | |
|---|---|---|
| 2001/0051593 A1 | 12/2001 | Patel |
| 2002/0033258 A1 | 3/2002 | Patel |
| 2003/0075360 A1 | 4/2003 | Patel et al. |
| 2004/0063795 A1 | 4/2004 | VonKrosigk et al. |
| 2004/0147404 A1 | 7/2004 | Thaemlitz et al. |
| 2004/0163814 A1 | 8/2004 | Todd et al. |
| 2006/0223714 A1 | 10/2006 | Svoboda et al. |
| 2008/0200354 A1* | 8/2008 | Jones .................... C09K 8/524 507/244 |

FOREIGN PATENT DOCUMENTS

| | | |
|---|---|---|
| EP | 727009 B1 | 9/2000 |
| EP | 1441104 A1 | 7/2004 |
| GB | 2338254 | 12/1999 |

OTHER PUBLICATIONS

International Search Report issued in International Application No. PCT/US2006/012673 dated Aug. 29, 2006 (3 pages).
U.S. Office Action issued in U.S. Appl. No. 12/751,567 dated Jun. 10, 2010 (11 pages).
Extended European Search Report issued in Application No. 06749477.3 dated Jul. 20, 2010 (5 pages).
Extended European Search Report issued in European Application No. 06740565.4 dated Jul. 21, 2010 (5 pages).
Office Action issued in Chinese Appliation No. 200680017830.9 dated Sep. 9, 2010 (5 pages).
Office Action issued in Chinese Application No. 200680017831.3 dated Oct. 13, 2010 (6 pages).
Office Action issued in corresponding European Application No. 06740565.4 dated Sep. 9, 2011 (4 pages).
International Search Report and Written Opinion issued in International Application No. PCT/US2006/012964, dated Aug. 29, 2006 (6 pages).
International Preliminary Report on Patentability issued in International Application No. PCT/US2006/012964; dated Oct. 9, 2007 (5 pages).
EP-Communication Art 94(3) issued in European Application No. 06749477.3; dated Aug. 30, 2011 (4 pages).
EP-Communication Art 94(3) issued in European Application No. 06740565.4; dated Sep. 1, 2011 (4 pages).
EP-Communication Art 94(3) issued in European Application No. 06740565.4; dated Feb. 23, 2015 (4 pages).
EP-Communication Art 94(3) issued in European Application No. 06740565.4; dated Aug. 8, 2017 (4 pages).

* cited by examiner

WATER BASED COMPLETION AND DISPLACEMENT FLUID AND METHOD OF USE

This application is a continuation application of U.S. application Ser. No. 13/335,251 filed Dec. 22, 2011, which issued on Nov. 26, 2013 as U.S. Pat. No. 8,592,354 which is a continuation of U.S. application Ser. No. 11/337,174, filed on Jan. 20, 2006, which issued on Jan. 31, 2012 as U.S. Pat. No. 8,105,989, that claims the priority under 35 U.S.C. § 119 to U.S. Application Ser. No. 60/668,485 filed Apr. 5, 2005. That application is incorporated by reference in its entirety.

BACKGROUND OF INVENTION

Field of the Invention

Embodiments relate generally to wellbore fluids. More specifically, embodiments relate to displacement and chemical breaker fluids.

Background Art

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

In most rotary drilling procedures the drilling fluid takes the form of a "mud," i.e., a liquid having solids suspended therein. The solids function to impart desired rheological properties to the drilling fluid and also to increase the density thereof in order to provide a suitable hydrostatic pressure at the bottom of the well. The drilling mud may be either a water-based or an oil-based mud.

Drilling muds may consist of polymers, biopolymers, clays and organic colloids added to a water-based fluid to obtain the required viscous and filtration properties. Heavy minerals, such as barite or calcium carbonate, may be added to increase density. Solids from the formation are incorporated into the mud and often become dispersed in the mud as a consequence of drilling. Further, drilling muds may contain one or more natural and/or synthetic polymeric additives, including polymeric additives that increase the rheological properties (e.g., plastic viscosity, yield point value, gel strength) of the drilling mud, and polymeric thinners and flocculents.

Polymeric additives included in the drilling fluid may act as fluid loss control agents. Fluid loss control agents, such as starch, prevent the loss of fluid to the surrounding formation by reducing the permeability of filter cakes formed on the newly exposed rock surface. In addition, polymeric additives are employed to impart sufficient carrying capacity and thixotropy to the mud to enable the mud to transport the cuttings up to the surface and to prevent the cuttings from settling out of the mud when circulation is interrupted.

Many drilling fluids may be designed to form a thin, low-permeability filter cake to seal permeable formations penetrated by the drill bit. The filter cake is essential to prevent or reduce both the loss of fluids into the formation and the influx of fluids present in the formation. Upon completion of drilling, the filter cake may stabilize the wellbore during subsequent completion operations such as placement of a gravel pack in the wellbore. Filter cakes often comprise bridging particles, cuttings created by the drilling process, polymeric additives, and precipitates. One feature of a drilling fluid is to retain these solid and semi-solid particles as a stable suspension, free of significant settling over the time scale of drilling operations.

The selection of the type of drilling fluid to be used in a drilling application involves a careful balance of both the good and bad characteristics of the drilling fluids in the particular application and the type of well to be drilled. The primary benefits of selecting an oil-based drilling fluid, also known as an oil-based mud, include: superior hole stability, especially in shale formations, formation of a thinner filter cake than the filter cake achieved with a water-based mud, excellent lubrication of the drilling string and downhole tools, and penetration of salt beds without sloughing or enlargement of the hole, as well as other benefits that should be known to one of skill in the art.

An especially beneficial property of oil-based muds is their excellent lubrication qualities. These lubrication properties permit the drilling of wells having a significant vertical deviation, as is typical of off-shore or deep water drilling operations or when a horizontal well is desired. In such highly deviated holes, torque and drag on the drill string are a significant problem because the drill pipe lies against the low side of the hole, and the risk of pipe sticking is high when water-based muds are used. In contrast, oil-based muds provide a thin, slick filter cake that helps to prevent pipe sticking, and thus the use of the oil-based mud can be justified.

Despite the many benefits of using oil-based muds, they have disadvantages. In general, the use of oil-based drilling fluids and muds have high initial and operational costs. These costs can be significant depending on the depth of the hole to be drilled. However, the higher costs can often be justified if the oil-based drilling fluid prevents the caving in or hole enlargement that can greatly increase drilling time and costs.

Disposal of oil-coated cuttings is another primary concern, especially for off-shore or deep-water drilling operations. In these latter cases, the cuttings must be either washed clean of the oil with a detergent solution that also must be disposed, or the cuttings must be shipped back to shore for disposal in an environmentally safe manner. Another consideration that must be taken into account is the local governmental regulations that may restrict the use of oil-based drilling fluids and muds for environmental reasons.

Oil-based muds typically contain some water, either from the formulation of the drilling fluid itself, or water may be intentionally added to affect the properties of the drilling fluid or mud. In such water-in-oil type emulsions, also known as invert emulsions, an emulsifier is used to stabilize the emulsion. In general, the invert emulsion may contain both water soluble and oil soluble emulsifying agents. Typical examples of such emulsifiers include polyvalent metal soaps, fatty acids and fatty acid soaps, and other similar suitable compounds that should be known to one of ordinary skill in the art.

After any completion operations have been accomplished, removal of filter cake remaining on the sidewalls of the wellbore may be necessary. Although filter cake formation is essential to drilling operations, the filter cake can be a significant impediment to the production of hydrocarbon or other fluids from the well if, for example, the rock formation is plugged by the filter cake. Because filter cake is compact, it often adheres strongly to the formation and may not be readily or completely flushed out of the formation by fluid action alone.

The removal of filter cake has been conventionally achieved with water based treatments that include: an aqueous solution with an oxidizer (such as persulfate), a hydrochloric acid solution, organic (acetic, formic) acid, combinations of acids and oxidizers, and aqueous solutions containing enzymes. For example, the use of enzymes to remove filter cake is disclosed in U.S. Pat. No. 4,169,818. Chelating agents (e.g., EDTA) have also been used to promote the dissolution of calcium carbonate. According to traditional teachings, the oxidizer and enzyme attack the polymer fraction of the filter cake and the acids typically attack the carbonate fraction (and other minerals). Generally, oxidizers and enzymes are ineffective in breaking up the carbonate portion, and acid are ineffective on the polymer portions.

One of the most problematic issues facing filter cake removal involves the placement of the clean-up solutions. Because one of the more common components in a filter cake is calcium carbonate, a clean-up solution would ideally include hydrochloric acid, which reacts very quickly with calcium carbonate. However, while effective in targeting calcium carbonate, such a strong acid is also reactive with any calcium carbonate in the formation (e.g., limestone), and can permeate into the formation.

The use of traditional emulsifiers and surfactants in the invert drilling fluid systems that formed the filter cake can further complicate the clean-up process in open-hole completion operations. Specifically, fluids using traditional surfactant and emulsifier materials may require the use of solvents and other surfactant washes to penetrate the filter cake and reverse the wettability of the filter cake particles. Invert emulsions drilling fluids that exhibit an acid induced phase change reaction have been previously described in U.S. Pat. Nos. 6,218,342, 6,790,811, and 6,806,233 and U.S. Patent Publication No. 2004/0147404, the contents of which are incorporated by reference in their entirety. The fluids disclosed in these references all contain one form or another of an ethoxylated tertiary amine compound that stabilizes the invert emulsion when it is not protonated. Upon protonation of the amine compound, the invert emulsion reverses and becomes a regular emulsion. In most cases, deprotonation of the amine compound allows for the reformation of an invert emulsion. The clean-up of wells drilled with this invert emulsion drilling fluid may be simplified by using a wash fluid that contains acid in a concentration sufficient to protonate the amine surfactant in the drilling fluid (and hence the filter cake). Thus, the presence of this amine surfactant in the drilling fluid may control the phase state (i.e., invert versus regular emulsions) of the fluids in the well. Similarly, U.S. Pat. No. 5,888,944 describes the use of an acid sensitive surfactant that stabilizes the invert emulsion of the drilling fluid. Upon the addition of an acid in a wash fluid, for example, the surfactant immediately protonates to break or invert the invert emulsion to an oil-in-water type emulsion.

The problems of efficient well clean-up, stimulation, and completion are a significant issue in all wells, and especially in open-hole horizontal well completions. The productivity of a well is somewhat dependent on effectively and efficiently removing the filter cake while minimizing the potential of water blocking, plugging, or otherwise damaging the natural flow channels of the formation, as well as those of the completion assembly. Thus there exists a continuing need for completion and displacement fluids that effectively clean the well bore and do not inhibit the ability of the formation to produce oil or gas once the well is brought into production.

Accordingly, there exists a need for a displacement and clean-up solution that will remove invert emulsion filter cake without damaging the formation while allowing for easy placement of the solution in the wellbore and control of the phase state of the drilling fluids in the well.

SUMMARY OF INVENTION

In one aspect, the present invention relates to a method of cleaning a wellbore, wherein the wellbore has been drilled with an invert emulsion drilling mud that forms an invert emulsion filter cake. The method may include the steps of circulating a breaker fluid into the wellbore, where the breaker fluid includes an aqueous fluid, a water soluble polar organic solvent, a hydrolysable ester of a carboxylic acid, and a weighting agent, wherein the hydrolysable ester is selected so that upon hydrolysis an organic acid is released and the invert emulsion of the filter cake breaks.

In another aspect, the present invention relates to a method of producing a hydrocarbon from a formation. The method may include the steps of drilling the formation with an invert emulsion drilling mud, performing at least one completion operation in the wellbore, emplacing a water-based breaker fluid in the wellbore, where the breaker fluid may include an aqueous fluid, a water soluble polar organic solvent, a hydrolysable ester of a carboxylic acid, and a weighting agent, and shutting the well for a predetermined time to allow the hydrolysis of the ester and the breaking of the invert emulsion filter cake.

In yet another aspect, the present invention relates to a solution that may include may include an aqueous fluid, a water soluble polar organic solvent, a hydrolysable ester of a carboxylic acid, and a weighting agent.

Other aspects and advantages of the invention will be apparent from the following description and the appended claims.

DETAILED DESCRIPTION

In one aspect, embodiments disclosed herein are generally directed to chemical breaker and displacement fluids that are useful in the drilling, completing, and working over of subterranean wells, preferably oil and gas wells. The displacement and completion fluids may be selected from a water based fluid and an invert emulsion fluid. The usefulness of the fluids disclosed herein is not dependent on the use of ethoxylated tertiary amines in the fluids used to drill the well. Thus, the broad applicability and usefulness of the fluids disclosed herein is greatly enhanced. The water-based and invert emulsion displacement and completion fluids of the present invention are particularly useful in wells that are drilled with an invert emulsion drilling fluid that forms an invert emulsion filter cake in the well.

In one embodiment, the breaker fluid may be an invert emulsion fluid that may include a non-oleaginous internal phase and an oleaginous external phase. The non-oleaginous internal phase may include a water soluble polar organic solvent, a hydrolysable ester of a carboxylic acid; and optionally a weighting agent such as a high density brine solution. The oleaginous external phase may include an oleaginous fluid such as diesel or other suitable hydrocarbon or synthetic oil, and an emulsifier. Optionally other components may include a viscosifying agent, a wetting agent, and a cleaning agent.

The oleaginous fluid used for formulating the invert emulsion fluids used in the practice of the present invention are liquids and are more preferably a natural or synthetic oil and more preferably, the oleaginous fluid is selected from the group including diesel oil, mineral oil, such as polyolefins, polydiorganosiloxanes, siloxanes or organo-siloxanes, and mixtures thereof. The concentration of the oleaginous fluid should be sufficient so that an invert emulsion forms and may be less than about 99% by volume of the invert emulsion. However, generally the amount of oleaginous fluid must be sufficient to form a stable emulsion when utilized as the continuous phase. In various embodiments, the amount of oleaginous fluid at least about 30 percent, preferably at least about 40 percent, and more preferably at least about 50 percent by volume of the total fluid. In one embodiment, the amount of oleaginous fluid is from about 30 to about 95 percent by volume and more preferably from about 40 to about 90 percent by volume of the invert emulsion fluid.

The non-oleaginous fluid also used in the formulation of the invert emulsion fluids is a liquid and preferably is an aqueous liquid. More preferably, the non-oleaginous fluid may be selected from the group including sea water, a brine containing organic and/or inorganic dissolved salts, liquids containing water-miscible organic compounds and combinations thereof. The amount of the non-oleaginous fluid is typically less than the theoretical limit needed for forming an invert emulsion. In various embodiments, the amount of non-oleaginous liquid is at least about 1, preferably at least about 5, and more preferably greater than about 10 percent by volume of the total fluid. Correspondingly, the amount of the non-oleaginous fluid should not be so great that it cannot be dispersed in the oleaginous phase. Thus, in one embodiment, the amount of non-oleaginous fluid is less than about 70% by volume and preferably from about 1% to about 70% by volume. In another embodiment, the non-oleaginous fluid is preferably from about 10% to about 60% by volume of the invert emulsion fluid.

In another embodiment, the breaker fluid may be a water based fluid that may include an aqueous fluid. Additionally, the water based fluid may include a water soluble polar organic solvent, a hydrolysable ester of a carboxylic acid; and optionally a weighting agent such as a high density brine solution. The aqueous fluid used in the water based fluids may be selected from the group including sea water, a brine containing organic and/or inorganic dissolved salts, liquids containing water-miscible organic compounds and combinations thereof.

The water soluble polar organic solvent should be at least partially soluble in a oleaginous fluid, but should also have partial solubility in an aqueous fluid. The polar organic solvent component of the present invention may be a monohydric, di-hydric or poly-hydric alcohol or a mono-hydric, di-hydric, or poly-hydric alcohol having poly-functional groups. Examples of such compounds include aliphatic diols (i.e., glycols, 1,3-diols, 1,4-diols, etc.), aliphatic poly-ols (i.e., tri-ols, tetra-ols, etc.), polyglycols (i.e., polyethylenepropylene glycols, polypropylene glycol, polyethylene glycol, etc.), glycol ethers (i.e., diethylene glycol ether, triethylene glycol ether, polyethylene glycol ether, etc.) and other such similar compounds that may be found useful in the practice of the present invention. In one preferred embodiment, the water soluble organic solvent is a glycol or glycol ether, such as ethylene glycol mono-butyl ether (EGMBE). Other glycols or glycol ethers may be used in the present invention so long as they are at least partially miscible with water.

The hydrolysable ester should be selected so that the time to achieve hydrolysis is predetermined on the known downhole conditions, such as temperature. It is well known in the art that temperature, as well as the presence of a hydroxide ion source, has a substantial impact on the rate of hydrolysis of esters. For a given acid, for example formic aid, one of skill in the art can conduct simple studies to determine the time to hydrolysis at a given temperature. It is also well known that as the length of the alcohol portion of the ester increases, the rate of hydrolysis decreases. Thus, by systematically varying the length and branching of the alcohol portion of the ester, the rate of release of the formic acid can be controlled and thus the breaking of the emulsion of an invert emulsion filter cake can be predetermined. In one preferred embodiment, the hydrolysable ester of a carboxylic acid is a formic acid ester of a C4 to C30 alcohol. In one embodiment, the hydrolysable ester of the carboxylic acid comprises from about 5 to 50 volume percent of a water-based breaker fluid, and preferably from about 20 to 40 volume percent. In another embodiment, the hydrolysable ester of the carboxylic acid comprises from about 20 to about 60 volume percent of an invert emulsion-based breaker fluid, preferably, greater than 30 volume percent. One example of a suitable hydrolysable ester of a carboxylic acid is available from Shrieve Chemical Group (The Woodlands, Tex.) under the name Break-910.

In the present illustrative embodiment, the weighting agent is preferably a high density brine containing salts of alkali and alkaline earth metals. For example, brines formulated with high concentrations of sodium potassium, or calcium salts of the halides, formate, acetate, nitrate, and the like; cesium salts of formate, acetate, nitrate, and the like, as well as other compounds that should be well known to one of skill in the art, can be used as solids free weighting agents. The selection of a weighting agent may partially depend the desired density of the breaker fluid, as known by one of ordinary skill in the art.

The emulsifier used in the invert emulsion breaker fluid should be selected so as to form a stable invert emulsion that breaks with time and/or upon hydrolysis of the ester. That is to say, when the pH of the invert emulsion's non-oleaginous phase changes, the emulsifier's hydrophilic-lipophilic balance (HLB) value is sufficiently shifted to destabilize the invert emulsion. The HLB value indicates the polarity of the molecules in a range of 1 to 40 that increases with increasing hydrophilicity of the emulsifier. Given the large variety of invert emulsion emulsifiers available, one of ordinary skill in the art need only do a routine screen of emulsifiers by forming an invert emulsion and adding a small amount of formic acid to see if the emulsion breaks. Preferred emulsifiers may include VERSAWET™ and VERSACOAT™, which are commercially available from M-I L.L.C., Houston, Tex. Alternatively, an amine-based acid sensitive emulsifier such as those described in U.S. Pat. Nos. 6,218,342, 6,790,811, and 6,806,233, the contents of which are incorporated by reference herein, may be used.

Both the invert emulsion fluids and water based fluids of the present invention may further contain additional chemicals depending upon the end use of the fluid so long as they do not interfere with the functionality of the fluids (particularly the emulsion when using invert emulsion displacement fluids) described herein. For example, wetting agents, organophilic clays, viscosifiers, fluid loss control agents, surfactants, dispersants, interfacial tension reducers, pH buffers, mutual solvents, thinners, thinning agents and cleaning agents may be added to the fluid compositions of this invention for additional functional properties. The addition of such agents should be well known to one of ordinary skill in the art of formulating drilling fluids and muds.

Wetting agents that may be suitable for use in this invention include crude tall oil, oxidized crude tall oil, surfactants, organic phosphate esters, modified imidazolines and amidoamines, alkyl aromatic sulfates and sulfonates, and the like, and combinations or derivatives of these. However, when used with the invert emulsion fluid, the use of fatty acid wetting agents should be minimized so as to not adversely affect the reversibility of the invert emulsion disclosed herein. Faze-Wet™, VersaCoat™, SureWet™, Versawet™ and Versawet™ NS are examples of commercially available wetting agents manufactured and distributed by M-I L.L.C. that may be used in the fluids disclosed herein. Silwet L-77, L-7001, L7605, and L-7622 are examples of commercially available surfactants and wetting agents manufactured and distributed by General Electric Company (Wilton, Conn.).

Organophilic clays, normally amine treated clays, may be useful as viscosifiers and/or emulsion stabilizers in the fluid composition of the present invention. Other viscosifiers, such as oil soluble polymers, polyamide resins, polycarboxylic acids and soaps can also be used. The amount of viscosifier used in the composition can vary upon the end use of the composition. However, normally about 0.1% to 6% by weight range is sufficient for most applications. VG-69™ and VG-PLUS™ are organoclay materials distributed by M-I, L.L.C., Houston, Tex., and Versa-HRP™ is a polyamide resin material manufactured and distributed by M-I, L.L.C., that may be used in this invention. In some embodiments, the viscosity of the displacement fluids is sufficiently high such that the displacement fluid may act as its own displacement pill in a well.

Suitable thinners that may be used in the breaker fluids disclosed herein include, for example, lignosulfonates, modified lignosulfonates, polyphosphates, tannins, and low molecular weight polyacrylates. Thinners are typically added to a drilling fluid to reduce flow resistance and control gelation tendencies. Other functions performed by thinners include reducing filtration and filter cake thickness, counteracting the effects of salts, minimizing the effects of water on the formations drilled, emulsifying oil in water, and stabilizing mud properties at elevated temperatures.

The inclusion of cleaning agents in the fluids disclosed herein should be well known to one of skill in the art. A wide variety of synthetic and natural product derived cleaning agents may be used. For example, a common natural product derived cleaning agent is d-limonene. The cleaning ability of d-limonene in well drilling applications is disclosed in U.S. Pat. No. 4,533,487, and in combination with various specialty surfactants in U.S. Pat. No. 5,458,197, the contents of which are incorporated herein.

The methods used in preparing both the water-based and invert emulsion breaker fluids utilized in the methods of the present disclosure are not critical. Specifically, with respect to the invert emulsion fluids, conventional methods can be used to prepare the invert emulsion fluids in a manner analogous to those normally used to prepare oil-based drilling fluids. In one representative procedure, a desired quantity of oleaginous fluid, such as diesel oil, is mixed with the selected emulsifier, viscosifying agent, and wetting agent. The internal non-oleaginous phase is prepared by combining the polar organic co-solvent and the hydrolysable ester into the selected brine with continuous mixing. An invert emulsion of the present invention is formed by vigorously agitating, mixing, or shearing the oleaginous fluid and the non-oleaginous fluid.

The breaker fluids disclosed herein may also be used in various embodiments as a displacement fluid and/or a wash fluid. As used herein, a displacement fluid is typically used to physically push another fluid out of the wellbore, and a wash fluid typically contains a surfactant and may be used to physically and chemically remove drilling fluid reside from downhole tubulars.

In one embodiment, a breaker fluid may be in a method of cleaning a wellbore that has been drilled with an invert emulsion drilling mud, and thus has an invert emulsion filter cake formed thereon. The breaker fluid may be circulated into the wellbore, contacting the invert emulsion filter cake. The hydrolysable ester contained within the breaker fluid may hydrolyze to release an organic acid and break the invert emulsion of the filter cake. The breaker fluid may be circulated in the wellbore that has not produced any hydrocarbons. Alternatively, if a wellbore that has already begun production of hydrocarbons is believed to be impaired by any residual filter cake left in the well following the drilling operations, a breaker fluid of the present invention may be used to clean the wellbore.

In another embodiment, the water-based breaker fluid and/or the invert emulsion breaker fluid may also be used as a displacement fluid to push fluids out of a wellbore. An invert emulsion breaker fluid may act as a push pill or displacement fluid to effectively displace the invert emulsion drilling mud. A water based breaker fluid may act as a displacement fluid to effectively displace brine from the wellbore.

In yet another embodiment, the water-based breaker fluid and/or invert emulsion breaker fluid may further be used as a wash fluid to physically and/or chemically remove the invert emulsion filter cake once the filter cake has been disaggregated by the breaker system.

In another embodiment, a breaker fluid (either a water-based or an invert emulsion fluid) disclosed herein may be used in the production of hydrocarbons from a formation. Following the drilling of a formation with an invert emulsion drilling mud, at least one completion operation may be performed on the well. A breaker fluid may then be circulated in the well, and the well may be shut for a predetermined time to allow the hydrolysis of the ester and the breaking of the invert emulsion of the filtercake formed from the drilling mud. In another embodiment, formation fluids may then enter the well and production of the formation fluids may ensue.

In some embodiments, the breaker fluid may be circulated in the wellbore during or after the performance of the at least one completion operation. In other embodiments, the breaker fluid may be circulated either after a completion operation or after production of formation fluids has commenced to destroy the integrity of and clean up residual conventional or reversible invert emulsion fluids remaining inside casing or liner.

Generally, a well is often "completed" to allow for the flow of hydrocarbons out of the formation and up to the surface. As used herein, completion processes may include one or more of the strengthening the well hole with casing, evaluating the pressure and temperature of the formation, and installing the proper completion equipment to ensure an efficient flow of hydrocarbons out of the well or in the case of an injector well, to allow for the injection of gas or water.

In one embodiment, a breaker fluid as disclosed herein may be used in a cased hole to remove any residual oil based mud left in the hole during any drilling and/or displacement processes. Well casing may consist of a series of metal tubes installed in the freshly drilled hole. Casing serves to strengthen the sides of the well hole, ensure that no oil or natural gas seeps out of the well hole as it is brought to the surface, and to keep other fluids or gases from seeping into the formation through the well.

Completion operations, as used herein, may specifically include open hole completions, conventional perforated completions, sand exclusion completions, permanent completions, multiple zone completions, and drainhole completions, as known in the art. A completed wellbore may contain at least one of a slotted liner, a predrilled liner, a wire wrapped screen, an expandable screen, a sand screen filter, a open hole gravel pack, or casing.

Another embodiment of the present invention involves a method of cleaning up a well bore drilled with the invert emulsion drilling fluid described above. In one such illustrative embodiment, the method involves circulating a breaker fluid disclosed herein in a wellbore, which as been drilled to a larger size (i.e., under reamed) with an invert emulsion drilling mud, and then shutting in the well for a predetermined amount of time to allow the hydrolysis of the ester to take place. Upon hydrolysis of the ester, the invert emulsion breaks, thus forming two phases, and oil phase and a water phase. These two phases can be easily produced from the well bore upon initiation of production and thus the residual drilling fluid is easily washed out of the well bore.

The fluids disclosed herein may also be used in a wellbore where a screen is to be put in place down hole. After a hole is under-reamed to widen the diameter of the hole, drilling string may be removed and replaced with production tubing having a desired sand screen. Alternatively, an expandable tubular sand screen may be expanded in place or a gravel pack may be placed in the well. Breaker fluids may then be placed in the well, and the well is then shut in to allow for the hydrolysis of the ester to take place. Upon hydrolysis of the ester, the invert emulsion breaks thus forming two phases, an oil phase and a water phase. These two phases can be easily produced from the wellbore upon initiation of production and thus the residual drilling fluid is easily washed out of the wellbore.

The amount of delay between the time when a breaker fluid according to the present invention is introduced to a well drilled with an invert emulsion drilling fluid and the time when the hydrolysable ester of a carboxylic acid hydrolyzes, releasing acid to break the invert emulsion filter cake may depend on several variables. The rate of hydrolysis of the hydrolysable ester may be dependent upon the downhole temperature, concentration, pH, amount of available water, filter cake composition, etc. In one embodiment, there may be preferable a downhole temperature of less than 270° F. for the applicability of the displacement fluids of the present invention in a given well.

However, depending on the downhole conditions, the breaker fluid formulation and thus the fluid's chemical properties may be varied so as to allow for a desirable and controllable amount of delay prior to the breaking of invert emulsion filter cake for a particular application. In one embodiment, the amount of delay for an invert emulsion filter cake to be broken with a water-based displacement fluid according to the present invention may be greater than 1 hour. In various other embodiments, the amount of delay for an invert emulsion filter cake to be broken with a water-based displacement fluid according to the present invention may be greater than 3 hours, 5 hours, or 10 hours.

In another embodiment, the amount of delay for an invert emulsion filter cake to be broken with an invert emulsion displacement fluid may be greater than 15 hours. In various other embodiments, the amount of delay for an invert emulsion filter cake to be broken with an invert emulsion displacement fluid may be greater than 24 hours, 48 hours, or 72 hours.

The following examples are provided to further illustrate the application and the use of the methods and compositions of the present invention.

EXAMPLES

The following examples were used to test the effectiveness of the displacement and clean-up solutions disclosed herein:

Example 1

An invert emulsion drilling mud, Fazepro™, commercially available from M-I, L.L.C. (Houston, Tex.), was heat aged by hot rolling for 16 hours at 200° F. and exhibited the following properties, as shown below in Table 1.

TABLE 1

| Heat-aged @ 200° F.-16 hrs - Rheology @ 120° F. | |
|---|---|
| 600 RPM | 118 |
| 300 RPM | 69 |
| 200 RPM | 50 |
| 100 RPM | 29 |
| 6 RPM | 6 |
| 3 RPM | 4 |
| Gels 10" | 6 lbs/100 ft$^2$ |
| Gels 10' | 10 lbs/100 ft$^2$ |
| Plastic Viscosity | 49 cP |
| Yield Point | 20 lbs/100 ft$^2$ |
| Electrical Stability | 38 volts |

Filter cakes built from the above invert emulsion drilling fluid were subjected to a modified High Temperature High Pressure (HTHP) Filtration test. The HTHP Filtration test uses a HTHP cell fitted with a fitted disc as a porous medium, on which a filter cake is built. In this example, the filter cakes were built on 35 micron disks. Upon application of 500 psi at 200° F. to the disks of filter cake, effluent was collected as shown in Table 2.

TABLE 2

| Time | Disk 1 (mL) | Disk 2 (mL) |
|---|---|---|
| Spurt | 1.4 | 1.4 |
| 1 min | 0.2 | 0.2 |
| 4 min | 0.6 | 0.6 |
| 9 min | 0.8 | 0.8 |
| 16 min | 1.0 | 1.2 |
| 25 min | 1.2 | 1.4 |
| 30 min | 1.2 | 1.4 |
| 36 min | 1.2 | 1.6 |
| 40 min | 1.4 | 1.6 |
| 1 hr | 2 | 3.4 |
| 2 hr | 2 | 4 |
| 3 hr | 4.4 | 4.6 |
| 4 hr | 5.4 | 5.6 |

A water based displacement breaker fluid was formulated having the following components, all of which are commercially available, as shown below in Table 3.

TABLE 3

| Component | Fluid 1 | Fluid 2 |
|---|---|---|
| 10.25 ppg Calcium Chloride | 235.4 ppb | 235.4 ppb |
| Acetic Acid | 0.2 ppb | 0.2 ppb |
| EGMBE | 31.9 ppb | 31.9 ppb |
| Break-910 | 141.1 ppb | — |
| Fazemul ™ | 0.8 ppb | 0.8 ppb |

Displacement fluids 1 and 2, formulated as shown in Table 3, were added to filter cakes disks 1 and 2, formulated from a Fazepro™ drilling fluid, and subjected to a modified HTHP Filtration test. Upon application of an initial pressure of 250 psi at 200° F. to the disks of filter cake having displacement fluids 1 and 2 poured thereon, effluent was collected as shown in Table 4 below. After 250 psi was applied for 40 minutes, the applied pressure was decreased to 25 psi. When a steady stream of effluent resulted through the disk, the test was concluded. From Table 4, it can be observed that Fluid 1, which contained a hydrolysable ester of a carboxylic acid, achieved a break-through of the filtrate at 16 minutes, while Fluid 2, which did not include the ester, did not. From an initial injection of 200 ml sea water of 8.42 sec and a final injection of 200 ml sea water/fluid 1 of 9.28 sec, a return to injection rate of 90.7% was calculated for this test.

TABLE 4

| Time | Disk 1 (mL) | Disk 2 (mL) |
|---|---|---|
| Spurt | 0.2 | 0.2 |
| 1 min | 0.2 | 0.2 |
| 4 min | 3.0 | 0.2 |
| 9 min | 10.8 | 0.2 |
| 16 min | 56 | 0.2 |
| 25 min | — | 0.2 |
| 30 min | — | 0.2 |
| 36 min | — | 0.2 |
| 40 min | — | 0.2 |
| 1 hr | — | 0.2 |
| 2 hr | — | 0.2 |
| 3 hr | — | — |
| 4 hr | — | — |

Example 2

An invert emulsion drilling mud, Fazepro™, commercially available from M-I, L.L.C. (Houston, Tex.), was heat aged by hot rolling for 4 hours at 200° F. and exhibited the following properties, as shown below in Table 5.

TABLE 5

| Heat-aged @ 200° F.-4 hrs - Rheology @ 120° F. | |
|---|---|
| 600 RPM | 112 |
| 300 RPM | 65 |
| 200 RPM | 48 |
| 100 RPM | 28 |
| 6 RPM | 5 |
| 3 RPM | 4 |
| Gels 10" | 6 lbs/100 ft² |
| Gels 10' | 11 lbs/100 ft² |
| Plastic Viscosity | 47 cP |
| Yield Point | 18 lbs/100 ft² |

Filter cakes built from the above invert emulsion drilling fluid were built on 35 micron disks and subjected to a modified HTHP Filtration test. Upon application of 500 psi at 200° F. to the disks of filter cake, effluent was collected as shown in Table 6.

TABLE 6

| Time | Disk 3 (mL) | Disk 4 (mL) |
|---|---|---|
| Spurt | 2.2 | 2.4 |
| 1 min | 0.8 | 0.6 |
| 4 min | 1.4 | 1.2 |
| 9 min | 1.6 | 1.6 |
| 16 min | 1.8 | 2.0 |
| 25 min | 2.4 | 2.4 |
| 30 min | 2.6 | 2.6 |
| 36 min | 2.8 | 2.8 |
| Modified HTHP Fluid Loss | 7.4 | 7.6 |
| 4 hr (incl. spurt) | 10.2 | 11.0 |

A water based displacement fluid was formulated having the following components, all of which are commercially available, as shown below in Table 7.

TABLE 7

| Component | Fluid 1 | Fluid 2 |
|---|---|---|
| 10.25 ppg CaCl$_2$ | 235.4 g | 235.4 g |
| EGMBE | 31.9 g | 31.9 g |
| Glacial Acetic Acid | 0.2 g | 0.2 g |
| Break-910 | 141.1 g | 141.1 g |
| Fazemul ™ | 0.8 g | 0.8 g |
| KCl | — | 4.0 g |

Displacement fluids 3 and 4, formulated as shown in Table 7, were added to filter cakes disks 3 and 4, formulated from the Fazepro™ drilling fluid, and subjected to a modified HTHP Filtration test. Upon application of an initial pressure of 400 psi at 200° F. to the disks of filter cake having displacement fluids 3 and 4 poured thereon, effluent was collected as shown in Table 8 below. After 400 psi was applied for 40 minutes, the applied pressure was decreased to 50 psi. When a steady stream of effluent resulted through the disk, the cell containing the disk was closed and allowed to soak for 24 hours at 200° F. From Table 9, it can be observed that Fluid 3 achieved a steady stream of effluent immediately and Fluid 4 achieved a steady stream after 9 minutes.

TABLE 9

| Time | Disk 3 (mL) | Disk 4 (mL) |
|---|---|---|
| Spurt | 9.8 | 0 |
| 1 min | — | 2 |
| 4 min | — | 4 |
| 9 min | — | 11 |

Further, while reference has been made to particular applications for the displacement and completion fluids of the present invention, it is expressly within the scope of the present invention that these fluids may be in used in a variety of well applications. Specifically, the fluids of the present invention may be used in both producing and injection wells, and may have further application in remedial clean-up of wells.

Advantageously, the present invention provides for a wellbore fluid that may break the emulsion of an invert emulsion filter cake and effectively remove such invert emulsion filter cake without inflicting damage on the surrounding formation. Displacement and completion fluids according to the present invention may exhibit high-viscosity indices such that they may behave as a high viscosity pill in the well completion process. Furthermore, a delay in the dissolution of the filter cake may be achieved by controlling the effectiveness and reactivity of the chemical breakers. The chemical properties of the displacement and breaker fluids disclosed herein may allow for the degradation of the emulsion of the invert emulsion filter cake and the dissolution of acid soluble bridging materials in the filter cake. Additionally, displacement and breaker fluids disclosed herein may be effectively used with either conventional invert emulsion or reversible invert emulsion drilling fluid filter cakes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of cleaning a wellbore, wherein the wellbore has been drilled with an invert emulsion drilling mud that forms an invert emulsion filter cake, the method comprising:
   circulating a single phase breaker fluid into the wellbore,
      the breaker fluid comprising:
         an aqueous fluid;
         a water soluble polar organic solvent;
         a hydrolysable ester of formic acid, wherein the hydrolysable ester of formic acid is present in the single phase breaker fluid at 30 to 60 volume percent; and
         a weighting agent; and
   wherein the hydrolysable ester is selected so that upon hydrolysis formic acid is released and the invert emulsion of the filter cake breaks.

2. The method of claim 1, wherein the water soluble polar organic solvent is a glycol or glycol ether.

3. The method of claim 2, wherein the water soluble polar organic solvent is ethylene glycol mono-butyl ether.

4. The method of claim 1, wherein the hydrolysable ester of formic acid is a formic acid ester of a C4 to C30 alcohol.

5. The method of claim 1, wherein the weighting agent comprises at least one of halide and formate salts of alkali and alkaline earth metals.

6. The method of claim 1, further comprising:
   displacing the aqueous fluid from the wellbore.

7. The method of claim 1, further comprising:
   removing the broken invert emulsion filter cake from the wellbore.

8. The method of claim 1, wherein the breaker fluid further comprises an ethoxylated tertiary amine.

9. A solution, comprising:
   an aqueous fluid;
   a water soluble polar organic solvent;
   a hydrolysable ester of formic acid, wherein the hydrolysable ester of the formic acid is a formic acid ester of a C4 to C30 alcohol and comprises from 30 to 60 volume percent of the solution; and
   a weighting agent,
   wherein the solution is a single phase.

10. The solution of claim 9, wherein the water soluble polar organic solvent is a glycol or glycol ether.

11. The solution of claim 10, wherein the water soluble polar organic solvent is ethylene glycol mono-butyl ether.

12. The solution of claim 9, wherein the weighting agent is a brine containing salts of alkali and alkaline earth metals.

13. The solution of claim 9, further comprising:
   at least one selected from a wetting agent, a cleaning agent, a viscosifying agent, a fluid loss control agent, a dispersant, an interfacial tension reducer, a pH buffer, a thinner, and a surfactant.

14. The solution of claim 9, wherein the aqueous fluid is selected from fresh water, sea water, a brine containing organic and/or inorganic dissolved salts, liquids containing water-miscible organic compounds and combinations thereof.

* * * * *